April 13, 1926.
O. A. PETREE
ULLAGE CALCULATOR
Filed May 26, 1925
1,580,529
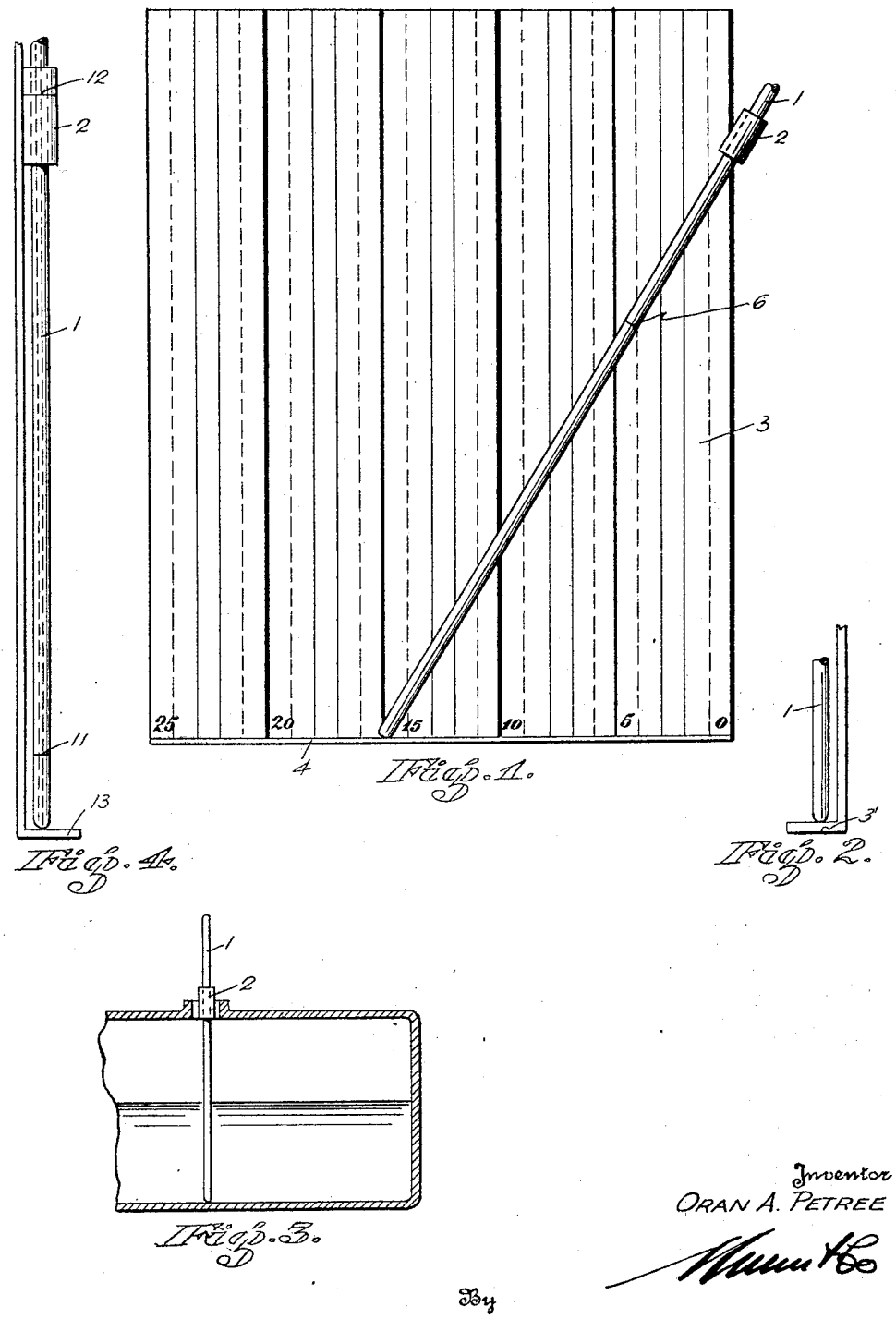
Inventor
ORAN A. PETREE
By
Attorneys Patented Apr. 13, 1926.

1,580,529

UNITED STATES PATENT OFFICE.

ORAN A. PETREE, OF PALO ALTO, CALIFORNIA.

ULLAGE CALCULATOR.

Application filed May 26, 1925. Serial No. 33,035.

*To all whom it may concern:*

Be it known that I, ORAN A. PETREE, a citizen of the United States, and a resident of Palo Alto, in the county of Santa Clara and State of California, have invented new and useful Improvements in Ullage Calculators, of which the following is a specification.

The present invention relates to improvements in ullage calculators, and is particularly intended to be used in connection with gas tanks of motor vehicles, its principal object being to allow the operator of a filling station to accurately ascertain what amount of gasoline is necessary to fill the tank of an automobile. Tanks as used at the present time are generally either rectangular in form or cylindrical, or sometimes elliptical, and it is a particular object of the present invention to provide a single chart which may be used for measuring the amount of gasoline needed whether the tank is of the rectangular type or of the rounded type. For this purpose I have combined two systems of graphically showing the amount of gasoline needed from data previously obtained, one system giving the data with relation to a rectangular tank and the second system giving the data relative to a cylindrical tank, and both systems being represented on a single chart.

The exact nature of my invention will be better understood from the following description in which reference is had to the accompanying drawing, in which—

Figure 1 is a front view of my chart and a measuring rod shown in operative positions relative thereto.

Figure 2 a fragmentary edge view of the chart.

Figure 3 a fragmentary section through a tank showing the rod in position for taking measurements, and Figure 4 a fragmentary side view of a chart and rod of somewhat modified form.

While I have shown only the preferred form of the invention, it should be understood that various changes or modifications may be made within the scope of the claims hereto attached without departing from the spirit of the invention.

To establish the number of gallons of gasoline necessary to fill the tank of a motor vehicle, it is first necessary to obtain certain data, namely, the capacity of the tank, the height of the tank and the height of the gasoline level within the tank, as well as the form of the tank. The capacity of the tank may be readily obtained from the owner and its form is either open to view or may be readily ascertained. To take the other data, namely, the height of the tank and the level of the liquid therein, I use a rod 1 of a length exceeding the height of any tank that may be made and provided with a sleeve 2 slidable thereon, the fit between the sleeve and the rod being sufficiently tight to cause the sleeve to remain in place. The rod is inserted in the tank and the sleeve is guided along the rod so that its lower edge is even with the underside of the top of the tank as illustrated in Figure 3. The level of the liquid will show on the outside of the rod sufficiently clear for use in the following operations.

The operator now has all the data necessary for ascertaining the number of gallons of gasoline necessary to fill the tank. He now refers to the chart 3. The system comprises a base line 4 having a plurality of equal units marked thereon beginning at the right hand side with zero and continuing to 25 on the left hand side, the latter number representing the highest capacity in gallons normally encountered in motor vehicle tanks. From each mark of the base rises a perpendicular line and this set of base and perpendicular lines is all that is necessary for establishing the number of gallons needed to fill the tank by means of the data previously obtained. The operator places the bottom end of his rod on the base line at the numeral which corresponds to the capacity of the tank, say 15 in this instance, a shelf 3' being provided for its support, and then swings the upper end of the rod so as to bring the bottom end of the sleeve 2 against the zero perpendicular in the manner shown in Figure 1. Assuming that the point 6 indicates the level of the gasoline in the tank, the number of gallons necessary to fill the tank may be immediately ascertained by referring to the perpendicular intersecting the rod at the point 6 which, in the present case, is perpendicular number 4, indicating that four gallons will be necessary to fill the tank.

It will be noted that the perpendiculars rising from the base line are printed in different shades to facilitate the reading of the same without referring to the numerals. Each tenth perpendicular, for instance, is represented by an extra heavy line while the perpendiculars 5 and 15 are represented by less heavy lines, and the two central perpendiculars of each five are drawn still lighter while the two perpendiculars adjacent each fifth unit are drawn in dashes. Once the operator gets used to this manner of drawing the lines, he will always be able to ascertain immediately the number of each perpendicular by its relative position without hunting for any printed numeral.

In the form thus far described, an ordinary rod was used that indicated liquid level on the outside thereof. It may be preferred to use a capillary tube which allows the liquid to rise within the tube somewhat above the level of the liquid in the tank. This situation has to be corrected before the data obtained from the stick can be used for the purposes described. A tube of this character is shown in connection with the chart in Figure 4. In this tube it is assumed that the gasoline will rise a certain distance above the level of the gasoline within the tank and to compensate for this error, the lower end of the tube is marked off as shown at 11 at a distance above the end corresponding to the distance between the levels of gasoline in the tank and in the tube and the sleeve 2 is provided with a similar mark 12 so that when the marks 11 and 12 are used instead of the bottom of the tube and the bottom of the sleeve, the result will again be correct. Where this kind of tube is used, it is also necessary to lower the shelf 13 for the tube correspondingly.

I claim:

1. A device for ascertaining the units of liquid needed to fill a tank of known capacity comprising a chart having a base line marked off in the units of the tank from a zero point and perpendiculars rising from the marks and a rod adapted to have the liquid level and the height of the tank marked thereon and allowing the needed units to be read from an intersected perpendicular when the bottom and height mark of the rod are placed opposite the tank capacity mark on the base line and the zero perpendicular.

2. A device for ascertaining the units of liquid needed to fill a tank of known capacity comprising a rod made to allow the height of the tank and the liquid level within the tank to be marked thereon and a chart arranged to allow the needed units to be read from the position of the level mark when the bottom end and the height mark of the rod are made to coincide with corresponding points on the chart.

ORAN A. PETREE.